United States Patent [19]

MacIntosh

[11] 4,032,023

[45] June 28, 1977

[54] APPARATUS FOR LOADING TOBACCO IN BARNS

[75] Inventor: Frank W. MacIntosh, Mt. Holly, N.C.

[73] Assignee: Gas-Fired Products, Inc., Charlotte, N.C.

[22] Filed: Mar. 29, 1976

[21] Appl. No.: 671,279

[52] U.S. Cl. .......................... 214/16.4 R; 214/1 Q; 214/5.5; 294/5.5
[51] Int. Cl.² ........................................ B65G 47/00
[58] Field of Search ............ 34/236; 432/DIG. 500; 214/16.4 R, 5.5, 312, 1 Q, 314; 294/5.5

[56] References Cited

UNITED STATES PATENTS

| 1,967,683 | 7/1934 | Ostrander | 214/314 |
| 3,804,272 | 4/1974 | Horne | 294/5.5 |
| 3,948,553 | 4/1976 | Suggs | 294/5.5 |

Primary Examiner—Lawrence J. Oresky
Attorney, Agent, or Firm—Clifton T. Hunt, Jr.

[57] ABSTRACT

Apparatus for loading tobacco into containers and for loading containers of tobacco into barns having a guide for facilitating evenly distributed loading of tobacco in containers, and structure for rotating the container from a first loading position to a second curing position. The container can be rotated 90° and positioned on wheeled tracks within a loading fixture and which align with corresponding wheeled tracks within a tobacco barn adapted to receive filled containers of tobacco for curing.

5 Claims, 9 Drawing Figures

LOADING POSITION

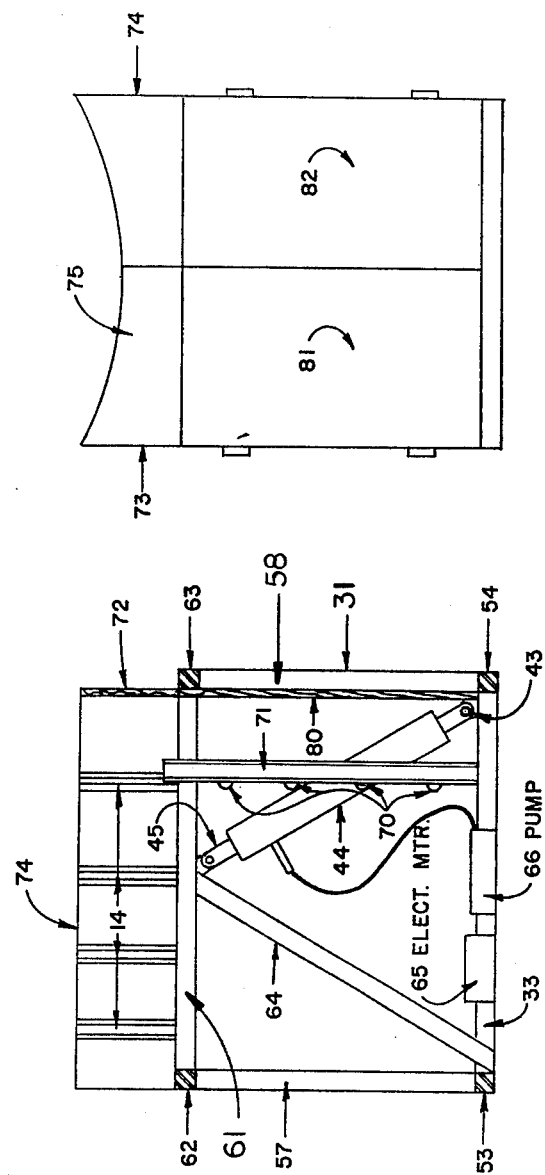

CURING POSITION

APPARATUS FOR LOADING TOBACCO IN BARNS

BACKGROUND OF THE INVENTION

The practice of stringing tobacco leaves on sticks or poles preparatory to hanging the sticks in a barn for curing the tobacco has given way in recent years to the use of mechanized picking and packing of tobacco in containers preparatory to putting a plurality of tobacco containers in a barn for curing. It has been the practice in the use of containers for curing tobacco to load the tobacco into a container arranged in a first or loading position and to then compress the tobacco in a filled container, after which it is held in place by a plurality of tines or elongated steel rods passing through the tobacco within the container. The container, thus loaded, is rotated 90° so that the tobacco within the container is arranged vertically to facilitate passage of air past the tobacco during curing. The rotating of the filled containers has been generally done with forklifts, 3 point tractor hitches, or manually.

One difficulty experienced with the prior practice of loading tobacco into containers with the leaves arranged in a flat or horizontal attitude within the container is that the tobacco tends to be more densely packed in the center of the container than at its sides. This is undesirable because it results in uneven amounts of air passing through the tobacco at the sides of the container than passes through the tobacco at the center of the container with the consequence that the tobacco within a given container is cured differently or irregularly.

SUMMARY OF THE INVENTION

The distribution of the tobacco in a container is evenly arranged according to the invention by the use of a concave guide sleeve extending about and above the top of the container while it is being loaded in the loading position. The frame is a rectangular configuration generally corresponding in dimension to the pack of tobacco with which it is associated in use. The sleeve has a vertical dimension of about 12 inches at its corners and along its two side wings. The front wing and back wing are curved downwardly from their corners to a height of about four inches at their centers so that in elevation the front and back wings of the sleeve are concave in shape. The container is preferably loaded manually and the purpose of the concavities in the sleeve is to encourage the operator to load the tobacco higher along the sides of the container than at the center of the container so that when it is compressed its density will be more uniform.

The invention also includes means for rotating a filled container from the loading position wherein the leaves are arranged in a horizontal attitude to a curing position wherein the leaves are arranged in a vertical attitude. The rotating mechanism includes a loading fixture for supporting the container in its first or loading position and, in the preferred embodiment of the invention, a hydraulic ram means is pivotally connected to the loading fixture supporting the container and operable to rotate the container 90° and position it on wheeled tracks within the loading fixture and which align with corresponding wheeled tracks within a tobacco barn adapted to receive filled containers of tobacco for curing.

BRIEF DESCRIPTION OF THE DRAWINGS

FIG. 3 is a longitudal sectional view taken substantially along the line 3—3 in FIG. 2;

FIG. 4 is a vertical sectional view taken substantially along the line 4—4 in FIG. 2;

DETAILED DESCRIPTION

Figures 1, 9:
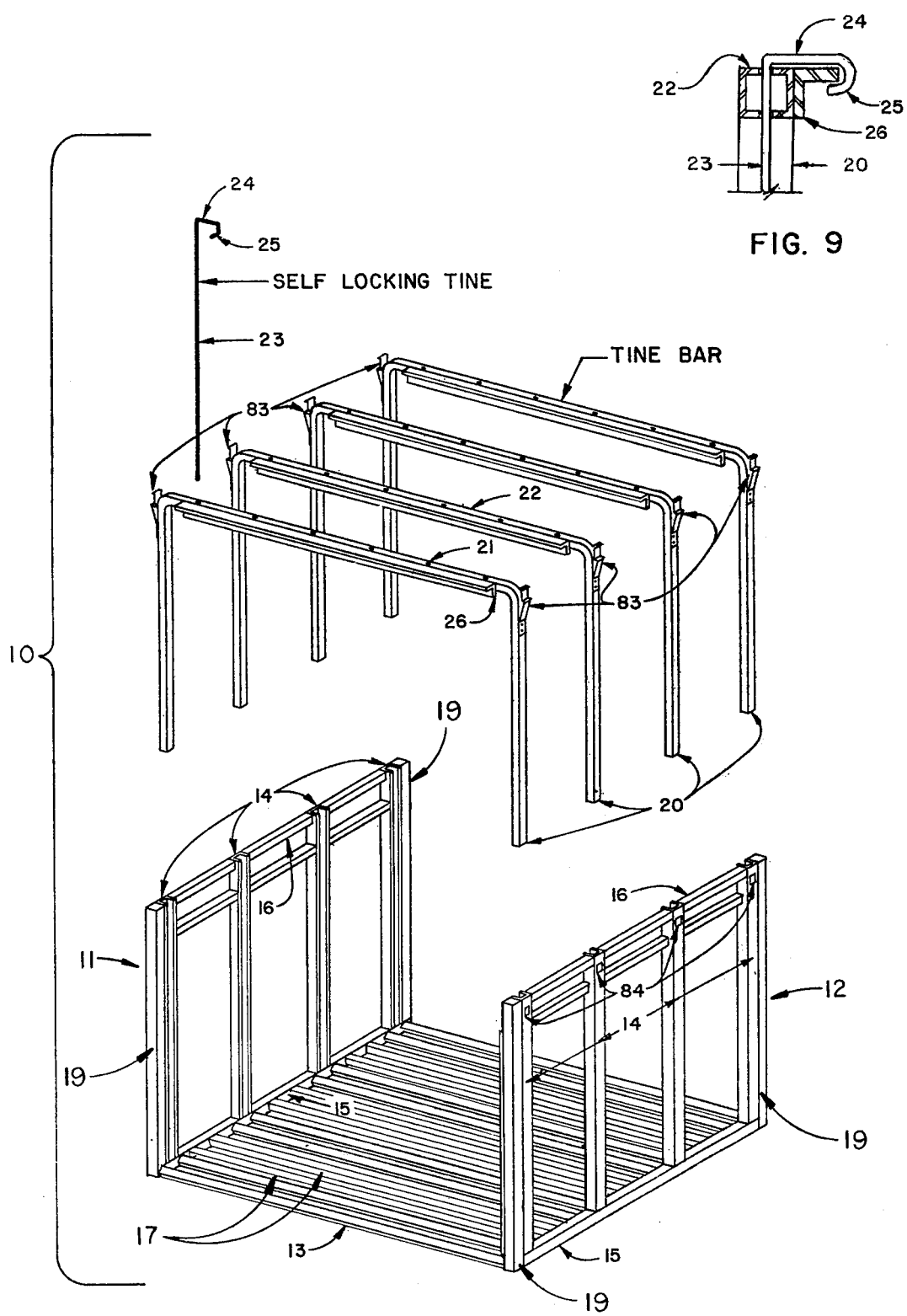
FIG. 1 is an exploded perspective of a tobacco container used in the bulk curing of tobacco and within which leaf tobacco is packed for curing in association with the loader of this invention.
FIG. 9 is an enlarged sectional view taken substantially along the line 9—9 in FIG. 8 and showing a tine bar in locked position.

Referring more specifically to the drawings, the numeral 10 broadly designates a container within which tobacco is loaded for curing. The container may be of any desired construction, and in the illustrated embodiment comprises a structural frame of any desired dimensions such as, for example, 3 feet high, 3 feet wide and 4 feet deep in the upright or loading position. Two opposed sidewalls 11 and 12 of the container 10 are formed by longitudinally spaced structural ribs 14 interconnected by longitudinally extending frame members 15 along the bottom of the sidewalls and by longitudinally extending frame members 16 along the tops of the side walls. The bottom wall 13 is defined by a plurality of longitudinally spaced bars 17 extending between bottom frame members 15. The bars 17 are more closely spaced than the ribs 14 to support the tobacco during loading. The ends and top of the container 10 are open.

The ribs 14 on the sidewalls serve as channels for the reception of tine bars 20, there being four (4) such tine bars associated with each container 10. Each rib 14 is a U-shaped piece of channel iron having an opening 84 through its web. Tine bars 20 have thru-holes 21 spaced along the length 22 of the bar to accommodate tines 23 which penetrate the tine bars and tobacco loaded into the container as seen in FIGS. 5–8.

Figure 8:
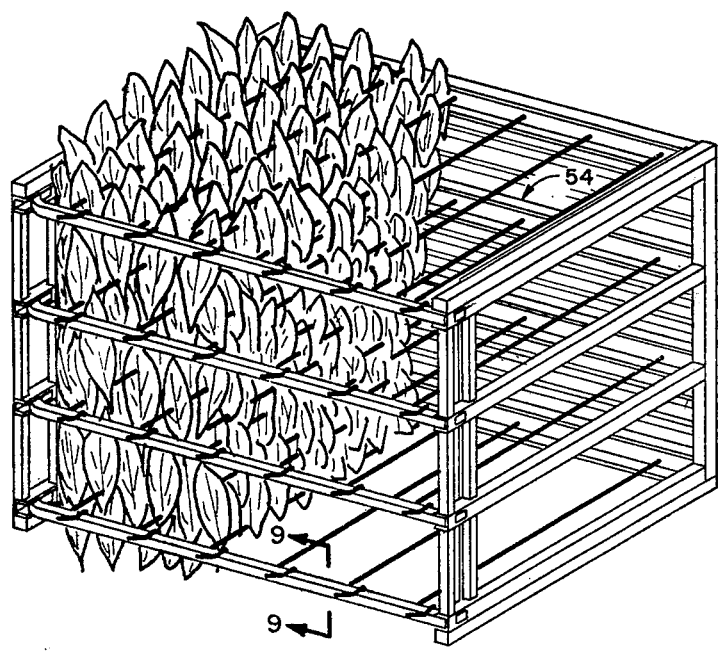
FIG. 8 is a perspective view of a container removed from the loader and illustrating how the tine bars are passed through the tobacco leaves, the container being shown only partially filled with tobacco but showing all of the tines for purposes of illustration.

Each tine 23 comprises a rod long enough to extend through the container 10 from its tine bar 20 positioned as shown in FIG. 8 into the space between adjacent bars 17 in the bottom (loading position) 13 of container 10. The ends of the tines 23 which penetrate the tobacco may be sharpened or blunt or any other desired configuration. The other end of the tines 23 are bent at about 90° to form short handles 24, the free ends of which are bent downwardly and inwardly to form locking tabs 25. Secured along each tine bar is the vertical leg of an angle iron 26 (in FIG. 1) having its other leg horizontally disposed in the same plane as the upper surface of the bar (in FIG. 1). The horizontal leg of the angle iron 26 serves as a ledge beneath which locking tabs 25 extend to lock the tines in place upon the tines 23 being rotated about their vertical axes after their lower ends have penetrated the leaf tobacco, as most clearly seen in FIGS. 8 and 9.

It is contemplated that in at least some instances the tines will be sufficiently retained in the containers by the tobacco and that the angle irons 26 and tabs 25 may not be needed.

The container 10 includes end posts 19 at each corner extending between the lower longitudinal frame members 15 and the upper longitudinal frame members 16. The end posts on either end of the container 10 serve as supports for the loaded container when in the carrying position of FIGS. 6 and 7.

The tines 23 and tine bars 20 are removed from and are not associated with the container 10 until after the container 10 is filled with leaf tobacco. In practice, the tobacco leaves are picked from the stalks in the field manually or mechanically, as desired, and the leaves may be brought to an empty container 10 which has been positioned within a loading fixture 31 of a loader 30. Alternatively, the container 10 can be filled on the tobacco harvester and the filled container brought to the loader 30.

Loader 30 comprises a skeleton framework including longitudinally extending base members 32 and 33 extending in spaced parallel relation to each other and spaced parallel transverse base members 34, 35 and 36. A plurality of vertically extending support members 37 diagonally extending brace members 38 rise from the longitudinal base members 32 and 33 to support longitudinally extending frame members 40 and 41 in superposed relation to respective base members 32 and 33.

A pair of hydraulic rams 42 and 42¹ are pivotally connected to respective base members 32 and 33 as at 43 and 43¹, the rams including cylinders 44 and 44¹ and rams 45 and 45¹. The rams 45 and 45¹ are pivotally connected as at 46 and 46¹ adjacent the midpoint of the loading fixture 31. The loading fixture 31 includes a rectangular base with longitudinally extending base members 51 and 52 and transversely extending base members 53 and 54. Corner posts 55 and 56 extend perpendicularly from opposite ends of longitudinal base member 51 and corner posts 57 and 58 extend perpendicularly from opposite ends of longitudinal base member 52. The loading fixture 31 also includes longitudinally extending upper support members 60 and 61 and transverse upper support members 62 and 63 extending between the ends of the corner posts 55-58 remote from the previously described frames 51-54. The loading fixture 31 is stabilized by diagonal braces 64.

Figure 2:
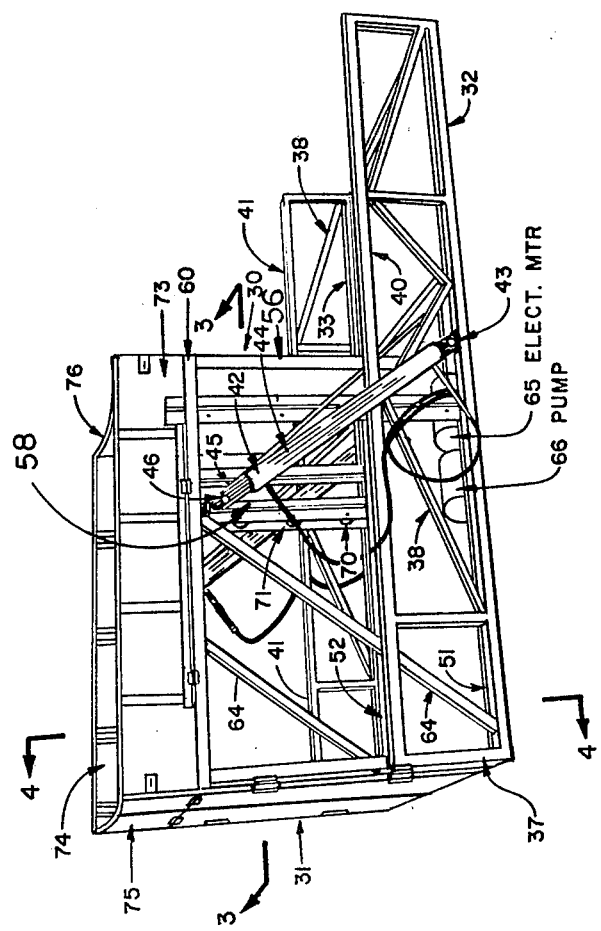
FIG. 2 is a perspective view of the loader showing its loading fixture in loading position but with the container removed.
Figure 5:
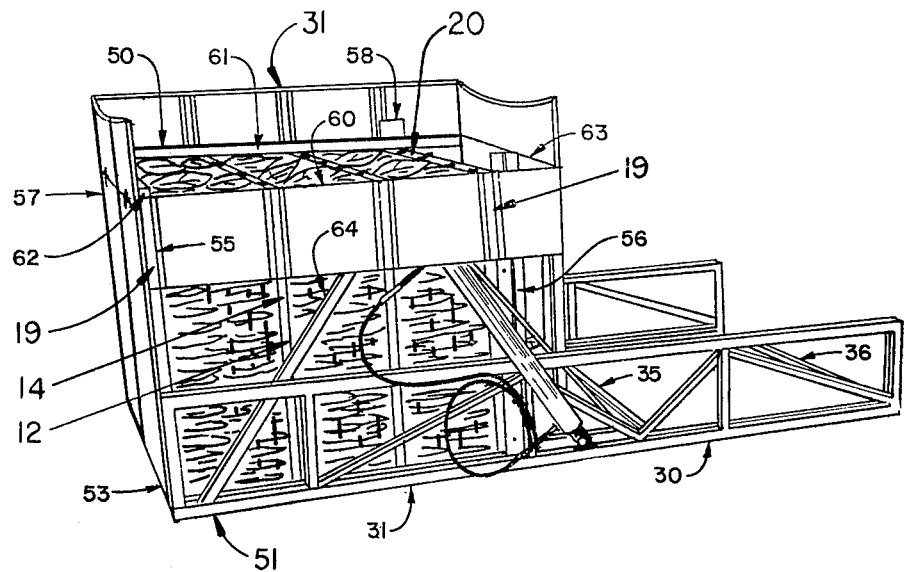
FIG. 5 is a view of the loader in loading position similar to FIG. 2 but showing a filled container in the loading fixture.
Figure 6:
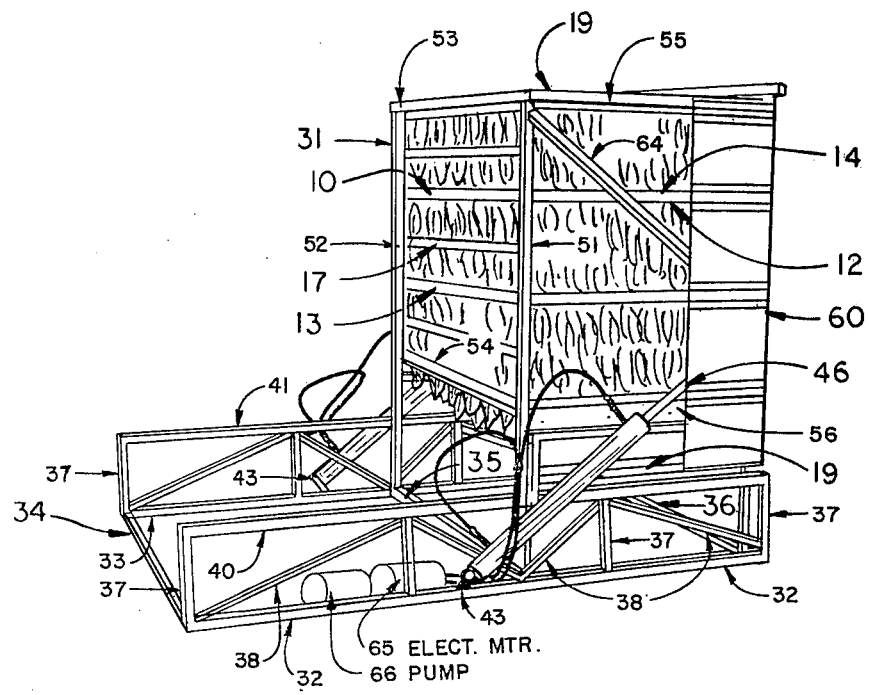
FIG. 6 is a view similar to FIG. 5 but showing the loading fixture and its associated filled container rotated 90° from the position shown in FIG. 5 to the second or curing position.
Figure 7:
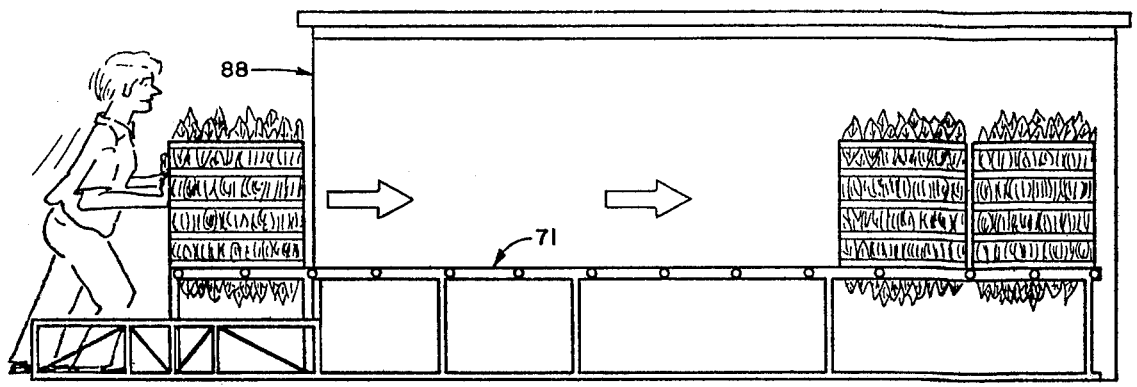
FIG. 7 is a somewhat schematic elevation, partially in section, showing a container in the curing position being moved along the tracks into position within the curing barn.

An electric motor 65 and a hydraulic pump 66 are provided to actuate the rams 42 to selectively move the loading fixture 31 from the loading position of FIGS. 2 and 5 to the curing or carrying position of FIG. 6.

In use, an empty open-topped tobacco container 10 is placed within the loading fixture 31 while the loading fixture 31 occupies the loading position of FIGS. 2 and 5. The container 10 is dimensioned to fit within the loading fixture 31 with the proximal end posts 19 of container 10 abutting rollers 70 mounted in trackway 71 extending between longitudinal members 51, 60 and 52, 61 and extending vertically in the loading position of FIGS. 2 and 5. The container 10 is also dimensioned to fit within the loading fixture 31 in FIGS. 2 and 5 beneath a hinged loading sleeve 72 extending peripherally around the upper edge of loading fixture 31 in FIGS. 2 and 5. The loading sleeve 72 is provided for the purpose of facilitating even loading of tobacco within container 10 and to permit sufficient loading of tobacco within the container 10 that it may be compressed before curing. The loading sleeve 72 includes opposed side wings 73 and 74 with straight upper edges and end wings 75 and 76 with concave upper edges. The side wings 73 and 74 with straight upper edges include channel members 14¹ coinciding with the channels 14 in the sidewalls 11 and 12 of container 10. The channels 14¹ in the loading sleeve guide the tine bars 20 into the channels 14 in the sidewalls of container 10 after tobacco has been loaded in the container 10 in conformance with the upper edges of the two opposing loading sleeve wings 75 and 76 with the curved upper edges.

The loading fixture 31 includes an end wall 80 extending between the longitudinal frame members 51, 52 and 60, 61 and adjacent corner posts 56 and 58 on the right of loading fixtures 31 in FIGS. 2 and 3. The wall 80 serves as an end wall for the container 10 when the container is positioned within loading fixture 31 while loading tobacco in the container 10. The loading fixture 31 also includes hinged end gate members 81 and 82 at the end of loading fixture 31, after which gate members 81 and 82 are closed to form an end wall for container 10. After an empty container 10 is positioned within loading fixture 31 between fixed end wall 80 and closed gate portions 81 and 82 the wings 73, 74, 75 and 76 of the loading sleeve 72 are latched into vertical upright position. Tobacco leaves are placed in container 10 and stacked on top of bottom bars 17 which are sufficiently closely spaced to support the tobacco leaves. The tobacco leaves are piled one on top of another until they reach the contoured top of the loading sleeve 72. This may be done either manually or mechanically as desired, but if done manually it affords the worker an opportunity to shake dirt and foreign matter from the leaves during packing of the container.

The purpose of the ends 75 and 76 with curved upper edges 72 is to overcome the natural tendency to put more tobacco in the center than at the sides of the container by furnishing a guide for the worker to put more tobacco on the sides than in the middle of the container. The desired effect is to distribute the tobacco evenly thoughout the container when it is compressed so it will have uniform density and thus allow uniform passage of air when the tobacco is being cured.

After the tobacco is loaded to the top of sleeve 72, the tine bars 20 are positioned within the channel-shaped guides 14¹ in the erected loading sleeve and guided to channels 14 in side walls 11 and 12 of container 10. The tine bars 20 are moved downwardly within the channels 14 until spring latches 83 mesh with openings or cut-outs 84 adjacent the open ends of channels 14 in side frames 11 and 12, thereby releasably locking the tine bars in place. The tobacco within the container 10 is compressed from the top of saddle 72 beneath the tine bars 20 to tightly pack the tobacco leaves within the container between the tine bars 20 and the bottom bars 17. Thereafter, tines 23 are inserted with openings 21 of tine bars 20 and forced through the tobacco leaves to hold them securely in position for curing.

At this stage, the loading sleeve wings 73, 74, 75 and 76 are folded downwardly preparatory to rotating the loading fixture 31 and its associated container 10 from the loading position of FIGS. 2 and 5 to the curing position of FIG. 6. Positioned as shown in FIG. 6, the container 10 rests on the wheeled trackway 71 of the loader 30 which has been previously positioned to align the trackway 71 with wheeled trackway 71¹ within tobacco curing barn 88. The container 10 is then manually pushed from loading fixture 31 into barn 88 on trackway 71¹, and the operation is repeated until the barn is filled with containers.

I claim:

1. Apparatus for loading leaf tobacco for curing comprising in combination,
    a. an air permeable container for receiving and supporting the tobacco during curing;
    b. a loading device including a longitudinal frame stationary in use and a loading fixture pivotally supported in a first loading position at one end of said frame and adapted to receive a container at the lower level of said longitudinal frame in said first loading position, means to lift and rotate the loading fixture and its associated container from said first loading position to a second curing position at the other end of the frame, said means to lift and rotate said loading fixture comprising a pivot located approximately at the lower level of said longitudinal frame, whereby the placement of the container is such that when said loading fixture is rotated the side of said container rests on the upper level of said longitudinal frame and, said loading fixture including a trackway on which the container rests in the loading fixture when in the second or curing position; and
    c. a tobacco curing barn adjacent said loading device and including a trackway in alignment and as an extension of said trackway in said loading fixture when in the second or curing position.

2. Apparatus according to claim 1 wherein a loading sleeve is connected to the loading fixture and selectively extensible above and circumferentially about a container positioned within the loading fixture preparatory to loading the container.

3. Apparatus according to claim 2 wherein said loading sleeve includes a plurality of hinged wings selectively movable from a folded position depending from the upper side and end frame members of the loading fixture to an upward vertical position extending about and above the periphery of a tobacco container positioned in a loading position within the loading fixture.

4. Apparatus according to claim 3 wherein said loading sleeve includes two opposed wings having straight upper edges and two opposed wings with curved upper edges.

5. Apparatus according to claim 1 wherein said means for lifting and rotating the loading fixture from a first loading position to a second curing position includes a pair of hydraulic rams extending from about the mid-point of said longitudinal frame and operatively connected to said loading fixture.

* * * * *